INVENTOR.
JOHANNES VAN SANDWYK
BY
ATTORNEY

Jan. 1, 1963   J. VAN SANDWYK   3,071,676
TEMPERATURE CONTROLLED OVEN
Filed Jan. 13, 1961   2 Sheets-Sheet 2

United States Patent Office 3,071,676
Patented Jan. 1, 1963

3,071,676
TEMPERATURE CONTROLLED OVEN
Johannes Van Sandwyk, Rochester, N.Y., assignor to General Dynamics Corporation, Rochester, N.Y., a corporation of Delaware
Filed Jan. 13, 1961, Ser. No. 82,620
6 Claims. (Cl. 219—20)

This invention relates to temperature controlled ovens and is particularly directed to thermostatic systems of the proportional control type where the gain of the control loop varies with ambient temperature.

Figure 1:
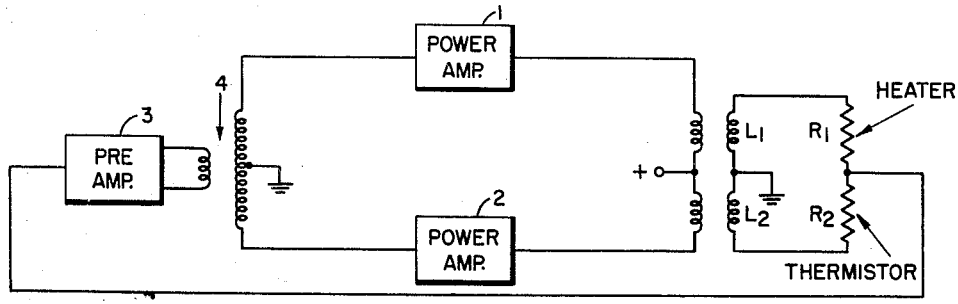
Figure 2:
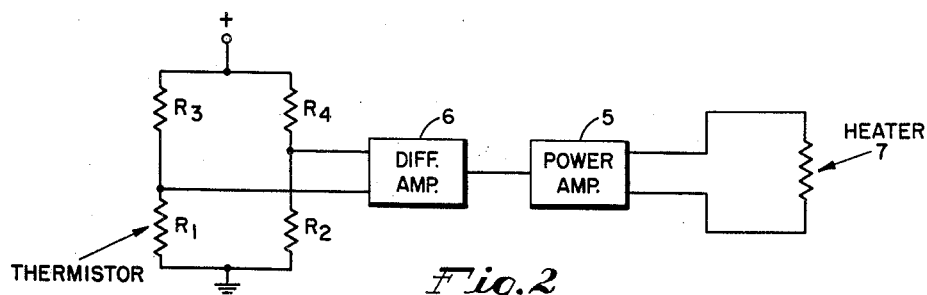

Temperature controls for ovens are of many types, the more important types being classifiable into two groups shown, respectively, in FIGS. 1 and 2 of the accompanying drawings. In one type, shown in FIG. 1, the heater resistances $R_1$ and $R_2$, having different temperature coefficients of resistance, are connected in a balanced bridge circuit including inductances $L_1$ and $L_2$ which in turn are coupled to power amplifiers 1 and 2. The power amplifiers are driven by the preamplifier 3 which receives balance-unbalance information from the bridge to feed more or less heating power to the heating elements, the degree of balance being proportional to the ratio of resistance of resistors $R_1$ and $R_2$. The disadvantages of this system are in the fact that a high-powered output transformer is required which is bulky and expensive; and if the oven containing the resistors contains a circuit operating at low level, such as a stable oscillator for radio equipment, the high A.C. power level in the heater can induce undesirable frequencies into the oscillator. Further, since a push-pull output stage must be used because of the high power required, a phase inverter, such as transformer 4, as well as two power amplifiers 1 and 2 are required which increases the number of components and cost. Worse, the prior art system of FIG. 1 requires an output stage which must operate as a class A or class AB because class B or class C has no gain at very low input voltages, which means a considerable sacrifice in efficiency.

The direct current system of the prior art shown in FIG. 2 comprises the heater 7 driven by the power amplifier 5 and the differential amplifier 6 which responds to unbalance voltages derived from the resistance bridge including $R_1$, $R_2$, $R_3$ and $R_4$, one resistance, $R_1$, being typically a thermistor having a relatively high negative thermal coefficient of resistance. $R_1$ and $R_2$, or the entire bridge, is placed in the oven with the heater 7. Resistances $R_2$, $R_3$ and $R_4$ usually have zero or near-zero coefficient of resistance, and the values of the four resistances are chosen so that at the required oven temperature a balance in the bridge is obtained. Always, a finite temperature deviation and a finite unbalance of the bridge is required to generate a signal sufficient to cause response in the amplifiers 6 and 5. If a relatively high gain amplifier is used, a relatively small temperature deviation and a small unbalance of the bridge is sufficient to obtain corrective current change in the heater. The disadvantages of the prior art system of FIG. 2 reside in the fact that high gain D.C. amplifiers are required. Traditionally, high gain D.C. amplifiers with good stability are difficult to design and operate. If high gain D.C. transistor amplifiers are used, there is present the problem of drift caused by changes in the base-to-emitter voltage and changes in the collector current. This usually limits the gain unless complicated circuits such as chopper type amplifiers are used.

The object of this invention is to provide an improved oven temperature control.

A more specific object of this invention is to provide an improved oven temperature control which obviates the disadvantages of both the A.C. and D.C. systems of the prior art, yet retains the advantages of both.

Figure 3:
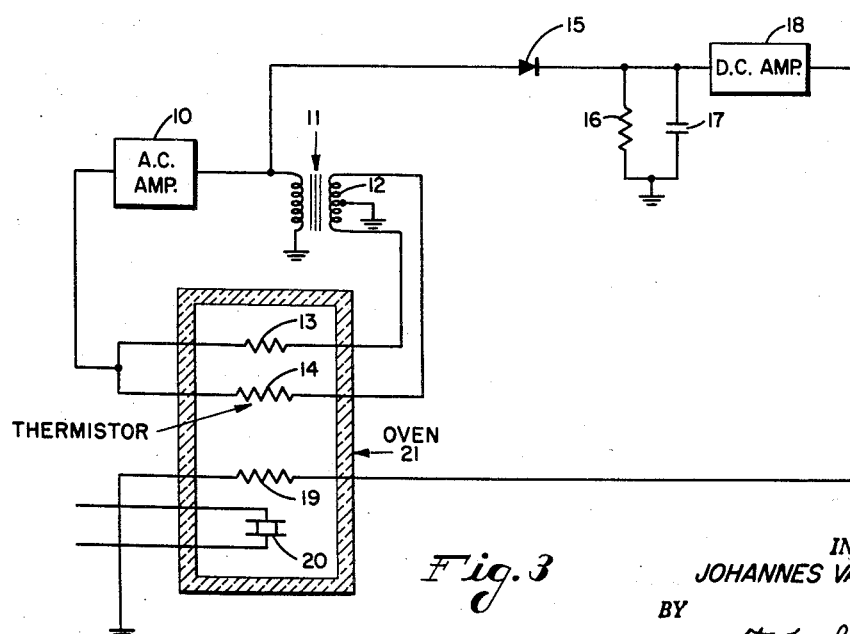
Figure 4:
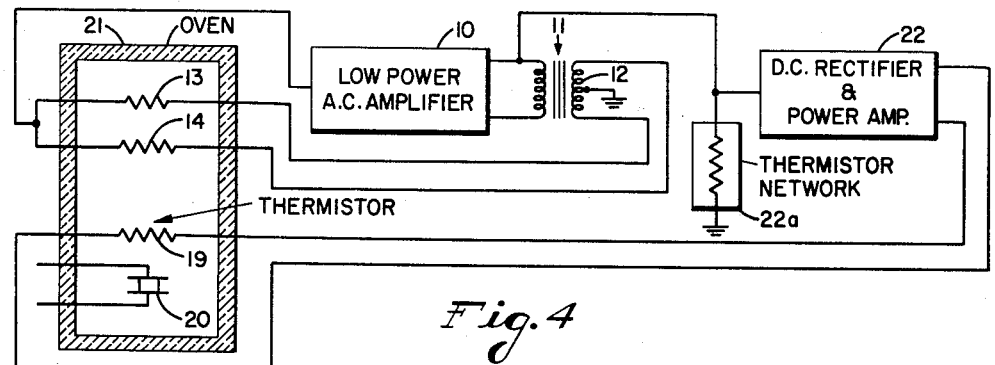
Figure 5:
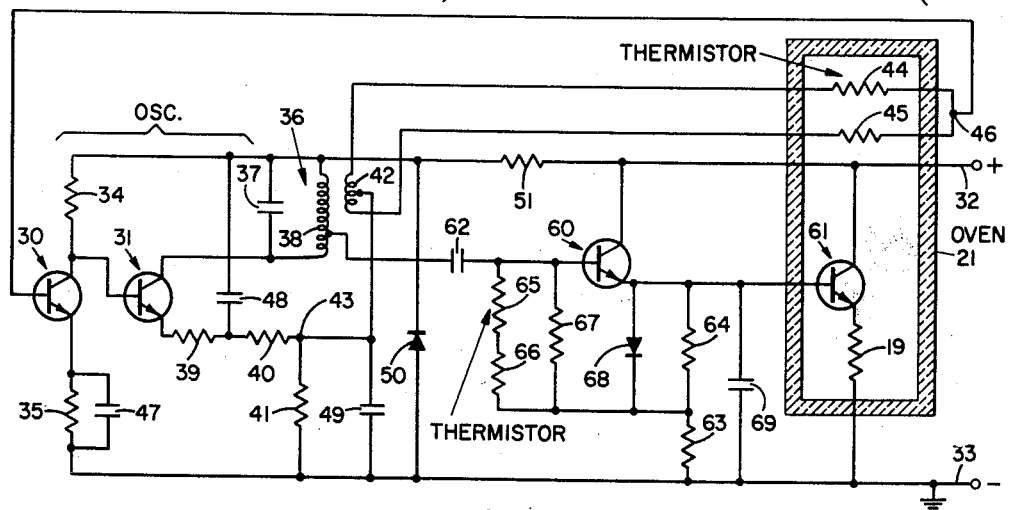
Figure 6:
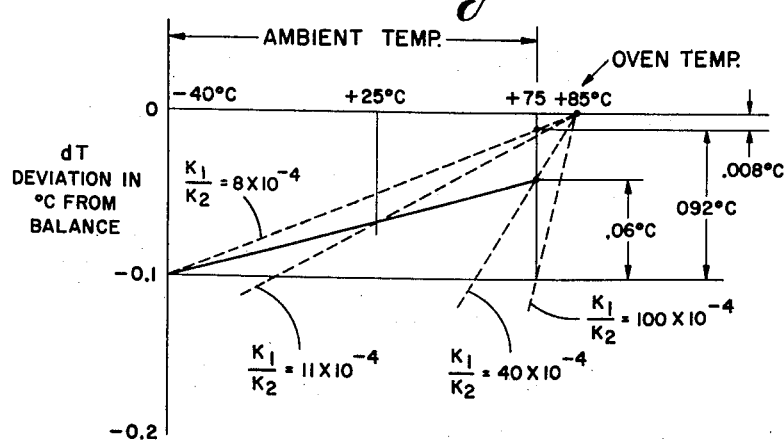

The objects of this invention are attained by employing a low-power high gain A.C. amplifier with a thermistor bridge placed in the oven and connected in the feedback loop in combination with a medium gain D.C. amplifier to supply the required heating power to the oven. A feature of the invention comprises means for varying the gain of the A.C. amplifier in this A.C.-D.C. system in accordance with ambient temperature. Other objects and features of this invention will become apparent to those skilled in this art by referring to the specific embodiments described in the following specification and shown in the accompanying drawings in which:

FIGS. 1 and 2 show prior art temperature controlled ovens;
FIGS. 3 and 4 show block diagrams of preferred embodiments of this invention;
FIG. 5 shows a complete circuit schematic diagram of the system shown in FIG. 4; and
FIG. 6 is a graph of temperature variations plotted against temperature deviations, to explain the operation of FIG. 5.

One oven control system of this invention, shown in FIG. 3, comprises the alternating current amplifier 10 coupled at its output through transformer 11, with a tapped secondary winding 12, to resistors 13 and 14. One of the resistors, 14, has a high thermal coefficient of resistance, while the other resistor, 13, has zero, near-zero, or opposite coefficient. The values of these resistors are so chosen with respect to the impedances of the two portions of the secondary winding 12 that feedback voltage from the junction of the two resistors to the input of the amplifier maintains oscillations of just sufficient amplitude to heat the oven 21 to the desired temperature, as will appear. When the bridge is further unbalanced, as by an incremental drop in oven temperature, and increased positive feedback voltage is fed to the input of the A.C. amplifier 10, thus increasing the amplitude of oscillations. There is thus provided a free-running oscillator, the amplitude of oscillations of which is a function of oven temperature.

According to this invention, the oscillator output is rectified in diode 15 and smoothed in the resistor-condenser combination 16 and 17. The amplitude of the D.C. voltage applied to the input of D.C. amplifier 18 supplies more or less power to heating element 19 within the oven. The piezoelectric crystal 20 within the oven is one example of an element which must be maintained precisely at a predetermined temperature for stable electrical operation. The oven 21 comprises any container which thermally insulates the interior of the oven from ambient temperatures. In operation of the system of FIG. 3, the direct current power is supplied to the heater 19 in smoothly and continuously variable quantities to hold the oven at the desired temperature. The incremental deviation of the oven temperature from the desired temperature necessary to initial corrective action depends upon the overall gain of both the A.C. amplifier 10 and the D.C. amplifier 18. In the system of FIG. 3, however, is retained the advantages of both A.C. and D.C. amplifiers without their disadvantages.

In FIG. 4, the operation of the positive feedback loop between the output and the input of the A.C. amplifier 10 is the same as in FIG. 3. Preferably, positive feedback occurs when thermistor 14 has a resistance larger than resistance 13, and the secondary of the transformer 11 is center tapped and grounded. Oscillations occur preferably at an audio or superaudio frequency and the A.C. voltage is fed to the power amplifier 22. The A.C. current supplied to amplifier 22 is rectified with the amplifier and more or less of the A.C. current is shunted to ground by the thermistor network 22a which is subject to ambient temperature, as will appear below in the description of FIG. 5.

A complete schematic diagram of the system of FIG. 4 is shown in FIG. 5. The A.C. amplifier of the oscillator consists of transistors 30 and 31 directly coupled together, as shown. These transistors are of the N-P-N type, in the embodiment shown, operating between the positive and negative bus bars 32 and 33, with the negative bar grounded. Alternatively, transistors of the P-N-P type may be employed merely by reversing the polarity of the bus bars. Load resistor 34 and emitter bias resistor 35 are connected in the collector-emitter circuit of transistor 30 as usual. The impedance in the collector circuit of transistor 31 includes the resonant tank circuit 36 including condenser 37 across inductance 38 to establish the oscillating frequency of the amplifier which in one successful embodiment was 17 kilocycles per second. The emitter circuit of transistor 31 includes resistances 39, 40 and 41. Coil 42 is coupled to the inductance 38 of the tuned tank circuit and its center tap is connected to the junction 43 between resistors 40 and 41. The two terminals of coil 42 are connected, respectively, to resistors 44 and 45 within oven 21. Resistor 44 has a high temperature coefficient of resistance, while resistor 45 has a coefficient of zero or of opposite sign, so that deviation of oven temperature from the predetermined optimum produces a change in the A.C. voltage at junction 46, resulting in a change in amplitude of oscillations which change the heating power in heater 19 such as to counteract the aforesaid deviation of the oven temperature, as will appear. The base bias for transistor 30 is obtained from the junction 43 of resistors 40 and 41 in the emitter circuit of transistor 31, via the tap on winding 42, the resistances 44, 45 and junction 46. This arrangement produces negative D.C. feedback to counteract shifts in gain caused by changes in collector current of transistors 30 and 31 resulting from aging or changes in ambient temperature. At the same time a considerable saving in components is obtained because this D.C. negative feedback permits direct coupling between transistor 30 and transistor 31. Choice of the operating frequency established by tank circuit 36 is unimportant for the proper operation of the circuit, but a high frequency has the advantage of permitting small sizes of components including inductance 38 and coupling capacitor 62 as well as decoupling capacitors 47, 48, 49 and 69. The function of resistance 39 is to provide a small amount of negative A.C. current feedback. Without this feedback the gain drops at low ambient temperature which is contrary to that which is desired. Since the input impedance of the second stage 31 is increased by the application of negative feedback, the gain of the first stage is increased, resulting in a much improved performance with respect to temperature for a small loss in gain. It has been found that a gain stability of ±1% over an ambient temperature range from −40 to +75° C. can be obtained in the A.C. amplifier of FIG. 5 by dropping the gain by a factor of only 2.

Gain variation caused by changes in supply voltages across buses 32 and 33 is effectively eliminated by stabilizing the supply voltage by the conventional Zener diode 50 and resistor 51.

The direct current power amplifier of FIG. 5 comprises the preamplifier transistor 60 and power transistor 61, both preferably being of the silicon type. The base of transistor 60 is coupled through coupling condenser 62 to inductance 38. A tap on inductance 38 for this purpose is convenient. Rectification of the A.C. voltage of the tap takes place in the emitter-to-base junction of transistor 60 which is connected in the common emitter configuration where the base is returned to the junction of resistances 63 and 64 in the emitter circuit. The return circuit includes thermistor 65 and resistor 66 in series, together in parallel with resistor 67. The function of the network including thermistor 65 and series resistor 66 and parallel resistor 67 is to make the gain of the amplifier 31 a controllable function of the ambient temperature. In the embodiment illustrated, it is preferred that the gain of the amplifier be reduced at elevated ambient temperatures where the difference between the ambient temperature and oven temperature is small. This is accomplished by employing the thermistor 65 which has reduced resistance at elevated ambient temperature to shunt tank circuit 36 and reduce the gain of the A.C. amplifier. Particular values of the series resistor 66, parallel resistor 67 and resistance of thermistor 65 can be selected to modify the temperature coefficient of the shunt path. Since resistances 65, 66 and 67 serve only to shunt the A.C. signal generated at the tap on winding 38, these resistances may be placed directly across the base emitter circuit, as shown in FIG. 5, or, if desired, between the tap on winding 38 and ground as capacitor 62 has low impedance at the operating frequency of the A.C. amplifier. Placing resistances 65, 66 and 67 as shown in FIG. 5 has the additional advantage of improving the D.C. stability of transistor 60 at elevated ambient temperatures.

In the interest of power efficiency, it is contemplated that the power amplifier 61 be mounted in close thermal contact with the oven along with the heating resistor 19.

The advantage of reducing the gain of the A.C. amplifier with increased ambient temperature can be seen from the following considerations. With good approximation, the heat lost, $P_1$, through the insulation of the oven walls can be taken to be proportional to the difference between the oven temperature, $T_O$, and the ambient temperature, $T_A$; that is, Power lost in the oven, $P_1 = K_1(T_O - T_A)$ where $K_1$ is heat loss in watts per degree centigrade. If the total power amplification of the amplifier-heater arrangement is substantially linear, it can be stated that the Power input to the oven, $P_2 = K_2(dT)$ where $K_2$ is gain in watts per degree centigrade, and $dT$ equals the difference between the temperature at which the bridge is balanced and the actual oven temperature. In equilibrium, it is obvious that $P_1$ must equal $P_2$, or $$K_1(T_O - T_A) = K_2 dT$$

Solving for $dT$, we have $$dT = \frac{K_1}{K_2}(T_O - T_A)$$

The variation of $dT$ with changing ambient temperature $T_A$ should be as small as possible. This is normally achieved by making the absolute value of $dT$ small by employing high values of amplifier gain in the system, $K_2$, but high gains are limited by the instabilities of the amplifier and the tendency of the system to hunt. However, we are not interested in the absolute value of $dT$ but rather in its variation because of changes in ambient temperature and we can, according to this invention, make $K_2$ variable with $T_O - T_A$, the variations of $K_2$ being either linear or nonlinear. A modest reduction of gain with increasing temperature will decrease $dT$ an appreciable amount, as illustrated graphically in FIG. 6.

In the temperature examples of FIG. 6, oven temperature $T_O = 85°$ C. so that from an assumed temperature range of −40° C. to +75° C., $T_O - T_A$ varies in the ratio of 12.5 to 1. It is assumed that the maximum permissible deviation in ° C. from balance, $dT$, shall be −0.1. It can be seen that with constant gain $K_1/K_2 = 8 \times 10^{-4}$, and $dT$ at +75° C. is .008°, resulting in a total change of .092° C. in oven temperature throughout the ambient temperature range from −40° to +75° C. If the gain at +75° C. is reduced by a factor of 12.5 by the action of thermistor 65 shunting more of the signal to ground, thus making $K_1/K_2 = 100 \times 10^{-4}$, $dT$ would be the same at the two extremes of ambient temperature, and the oven temperature would be the same at both extremes. By proper choice of value of resistors 66 and 67, $dT$ can be made the same at an intermediate ambient temperature. Thus, although the oven temperature differs 0.1° C. from the temperature at which the bridge is balanced, it would remain constant over the ambient temperature range. If, on the other hand, the gain at +75° C. is reduced by a factor of, say, 5, making $K_1/K_2 = 40 \times 10^{-4}$ the oven temperature would have changed only .06° C., a reduction of 35 percent from the value of .092° C. that would have been obtained with a constant gain system. As stated, both the slope and shape of the temperature deviation curve can be varied by proper choice of resistance values of 65, 66 and 67. In FIG. 6, a linear deviation is shown for the case that the gain is reduced by 5 at 75° C. with the gain reduction required at +25° C. to obtain linearity. It can be seen that the temperature variation of the oven can be greatly improved if the gain is reduced by a proper amount with increasing ambient temperature.

High output power from amplifier 61 during warm-up is increased, according to another feature of this invention, by connecting the diode 68 across the emitter resistor 64. This diode reduces the total resistance in the emitter circuit of transistor 60, thus enabling the transistor 60 to supply high input current to the power transistor 61. During normal regulation, however, the diode has very little effect because of the low voltage across it. Condenser 69 serves to smooth the A.C. ripple in the output of the rectifier circuit of transistor 60.

The oven temperature control of this invention utilizes the advantages of both an A.C. regulator and a D.C. power amplifier without the disadvantages of either. By connecting the thermistor in the balanced bridge of the oscillator internally of the oven, and the thermistor of the D.C. amplifier externally of the oven, advantages are attained of high gain without instability or hunting, yet small deviations $dT$ in degree centigrade are attained.

What is claimed is:

1. In a thermostatically controlled oven, an alternating current amplifier of relatively low power handling capacity, a coupling circuit means between the output and input circuit of said amplifier to produce self-sustained oscillations, a temperature sensitive element responsive to the temperature in said oven and connected in said coupling circuit means for attenuating the feedback energy and the amplitude of oscillations as a function of oven temperature, a heating element for said oven, a direct current amplifier with a gain control circuit, said direct current amplifier having relatively high power handling capacity sufficient to heat said oven to an optimum operating temperature and being coupled between the output circuit of said alternating current amplifier and said heating element, and a temperature responsive element outside said oven and connected to the loop including said amplifiers and heating element to smoothly vary the gain of said loop as a function of ambient temperature.

2. In a temperature controlled oven system, an alternating current oscillator including an A.C. feedback circuit, a temperature-sensitive resistor connected in said feedback circuit and disposed within the oven to be controlled to make the amplitude of oscillations a function of oven temperature, a direct current power amplifier coupled to the output of said oscillator, means coupled to the output of said power amplifier for continuously heating the space within said oven, a second temperature-sensitive resistor connected in the oscillator-to-amplifier coupling circuit to attenuate a portion of the A.C. signal supplied to said power amplifier, said second temperature-sensitive resistor being disposed externaly of said oven to control the increments of heating current as a function of ambient temperature.

3. In combination with an oven, an oscillator, a first temperature-sensitive resistor disposed in said oven and connected in the feedback circuit of said oscillator to vary said oscillations as a function of oven temperature, a heating element in said oven, a direct current amplifier connected between said oscillator and said heating element to continuously heat said element, and a second temperature-sensitive resistor disposed externally of said oven and connected to said oscillator to vary the heating loop gain as a function of ambient temperature.

4. In combination with an oven the temperature of which is to be controlled, an oscillator, a resistor having a predetermined temperature coefficient of resistance coupled to said oscillator to control the amplitude of oscillation as a function of oven temperature, a power amplifier, a heating resistor in said oven, said amplifier being coupled between said oscillator and said heater, a temperature sensitive resistor responsive to ambient temperature coupled across the alternating current between said oscillator and said power amplifier, said temperature sensitive resistor having a temperature coefficient of resistance to variably attenuate the power to said heating element as a predetermined continuous function of ambient temperature.

5. In combination with a temperature controlled oven, an oscillator, said oscillator comprising two directly coupled transistors, one of said transistors having an emitter-follower resistance to stabilize the amplitude to oscillations with variations in ambient temperature, said oscillator having a feedback circuit to sustain free-running oscillations, a temperature-sensitive resistor disposed in said oven and connected in said feedback circuit to produce oscillations the amplitude of which is a function of said oven temperature, a rectifier circuit coupled to the output of said oscillator for rectifying the output of said oscillator, an amplifier coupled to the output of said rectifier, a heating element disposed in said oven and coupled in the output of said amplifier, and a second temperature-sensitive resistor connected in the oscillator-to-rectifier circuit to vary the loop gain of said oscillator as a function of ambient temperature, said transistor having an emitter-follower resistor, and a diode connected across said emitter-follower resistor to reduce the negative feedback of said resistor when high amplitude signals are applied to said transistor.

6. In combination with an oven the temperature of which is to be controlled, an alternating current amplifier comprising two directly coupled cascaded transistors, the second of said cascaded transistors having an emitter-follower resistor to stabilize the gain of said transistor with changing ambient temperatures, a resonant tank circuit coupled in the output of said second transistor, a winding with an intermediate tap inductively coupled to the inductance of said tank circuit, two resistors of different coefficient of resistance coupled, respectively, between the terminals of said winding and the input of the first of said cascaded transistors, said intermediate tap being connected to an intermediate point on said emitter-follower resistance to apply a variable bias on said input electrode, a rectifier transistor coupled to said tank circuit, a power amplifier comprising a power transistor coupled to said rectifier, a heating resistor in said oven coupled to the output of said power transistor, and means for varying the gain of said alternating current amplifier as a function of ambient temperature so that the gain is reduced at the higher ambient temperature to minimize hutning effects.

References Cited in the file of this patent

UNITED STATES PATENTS

| | | |
|---|---|---|
| 2,616,020 | Fay et al. | Oct. 28, 1952 |
| 2,806,200 | Ketchledge | Sept. 10, 1957 |
| 2,947,915 | Patchell | Aug. 2, 1960 |
| 2,984,729 | Hykes et al. | May 16, 1961 |

UNITED STATES PATENT OFFICE

CERTIFICATE OF CORRECTION

Patent No. 3,071,676 January 1, 1963

Johannes Van Sandwyk

It is hereby certified that error appears in the above numbered patent requiring correction and that the said Letters Patent should read as corrected below.

Column 2, line 37, for "and" read -- an --; column 5, line 67, for "externaly" read -- externally --; column 6, line 64, for "hutning" read -- hunting --.

Signed and sealed this 16th day of July 1963.

(SEAL)
Attest:

ERNEST W. SWIDER
Attesting Officer

DAVID L. LADD
Commissioner of Patents